Nov. 19, 1935.   R. T. MAJOR ET AL   2,021,872
DIVINYL ETHER AND PROCESSES FOR ITS PRODUCTION
Filed July 16, 1931
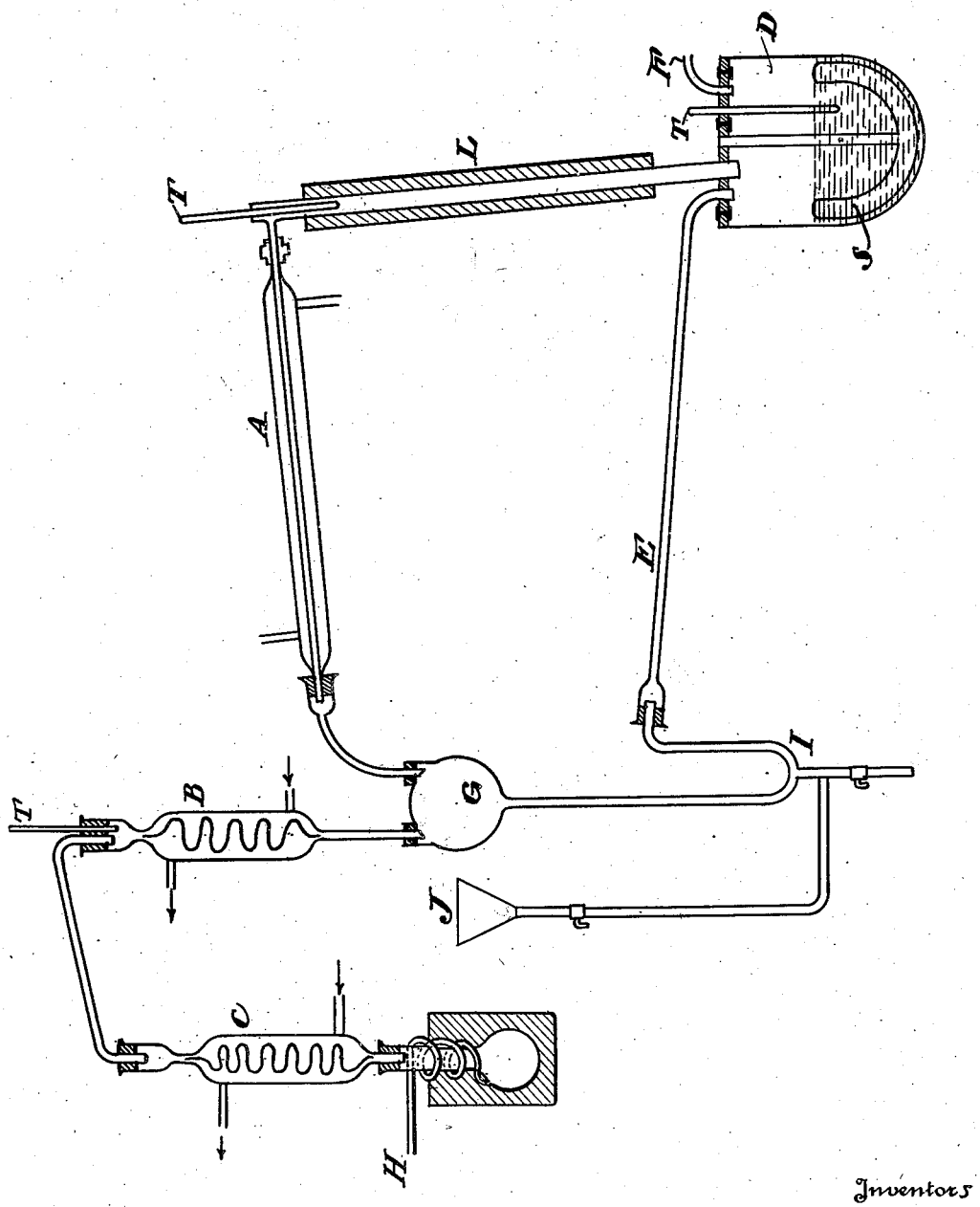
Inventors
Randolph T. Major
and William L. Ruigh
By Charles A. Davies
Attorney Patented Nov. 19, 1935

2,021,872

UNITED STATES PATENT OFFICE 2,021,872

DIVINYL ETHER AND PROCESSES FOR ITS PRODUCTION

Randolph T. Major, Westfield, and William L. Ruigh, Rahway, N. J., assignors to Merck & Co., Inc., Rahway, N. J., a corporation of New Jersey Application July 16, 1931, Serial No. 551,098

13 Claims. (Cl. 260—151)

This invention relates to improvements in divinyl ether and processes for its production.

The production of divinyl ether has long been the subject of research by eminent chemists, but a study of the literature bearing on the subject establishes the fact that a true divinyl ether has not hitherto been isolated. Our study and research work clearly shows that the products obtained were probably complex mixtures.

It is an object of the present invention to isolate pure divinyl ether. A further object is to produce divinyl ether, substantially free from aldehydes and other undesirable impurities, and adaptable for anesthetic purposes as well as for industrial uses. Other objects will become apparent as the disclosures herein are better understod.

Leake and Chen ("Proc. Soc. Experimental Biology and Medicine", 1930, XXXVIII) indicated, from their studies of the anesthetic properties of unsaturated ethers, that it seems possible to predict the anesthetic power and relative toxicity from the chemical characteristics. Thus, for instance, it appears that in certain aliphatic compounds the degree of toxicity is proportional to the number of carbon atoms found in the straight carbon chain. Also related to chemical structure in the series are certain anesthetically important physical properties, such as boiling points. They state further, "So, one might venture to anticipate that the higher members of our proposed homologous series of unsaturated ethers would not be found as satisfactory inhalation anesthetic substances as the lower members of the series, because of too high boiling points and too great toxicity." All these and other theoretical considerations point to the true divinyl ether as a promising anesthetic material.

Practical, though limited and somewhat indefinite pharmacological work, with a product of uncertain composition and purity also supports the comparative value of such a compound over other low-boiling unsaturated aliphatic ethers.

It is known to us that references to "divinyl ether" have been made in chemical literature, but our work in developing processes for the production of the theoretical unsaturated ether, $CH_2=CH-O-CH=CH_2$, shows that the products, hitherto produced and described as "divinyl ether", were, as already suggested above, of uncertain composition, and that, though such preparations may have included appreciable quantities of true divinyl ether, the true ether had never, before the development of our discovery of an efficient process for its production, been made and isolated in its true and practically pure form. This is definitely supported by the low boiling-point of our product as compared with the boiling-points given by previous investigators. Other considerations for this view will appear as we proceed with the description of our improved process and the further definition of our product.

The first recorded reference to divinyl ether we find in a paper by Semmler (1887) "On the Ethereal Oil of Allium Ursinum L." (Ann., 241, 111–116). This author treated divinyl sulphide, which was obtained from the essential oil of the named plant, with silver oxide. From this reaction he obtained a low-boiling, sulphur-free liquid, the boiling point of which was given by him as about 39° C. While two molecular weight determinations apparently checked the theoretical value for divinyl ether, he made no further characterization of the liquid obtained.

In 1899, Knorr and Matthes (Ber. 32, 736), attempted to prepare divinyl ether by the exhaustive methylation of morpholine, by which processes they obtained but a very small quantity of liquid, which was insufficient for either a definite analysis or a determination of the boiling-point. The identity of the compound obtained by them was therefore never established.

In 1925, Cretcher, Koch, and Pittenger (Jour. Amer. Chem. Soc. 47, 1175–6) undertook to prepare divinyl ether by the action of heated sodium hydroxide on $\beta,\beta'$-dichlor-diethyl ether. Their reaction was carried out in an iron pot surmounted by a Crismer column. The distillate obtained, working in this manner, came over at 84–5° C., and in this mixture these investigators were able to identify $\beta$-chloroethyl-vinyl ether, 1,4-dioxane, acetaldehyde, and a liquid which they assumed to be "divinyl ether", boiling at 39° C. The reported yield of this material boiling at 39° C. was 4.7% calculated from the total amount of the $\beta,\beta'$-dichlor-diethyl ether used. No further physical or chemical properties, beyond the boiling-point previously mentioned, were described by these authors. The acetaldehyde formed in the course of their reaction amounted to twice the weight of the material boiling at 39° C.

In 1929 Hibbert, Perry, and Taylor (Jour. Amer. Chem. Soc. 51, 1551) reported a process which was in fact a modification of the above method. This modification consisted of replacing the Crismer column with a reflux condenser kept at 40° C.; using potassium hydroxide instead of sodium hydroxide; adding the dichlor-diethyl ether in small portions; and increasing the time of heating. They reported that they obtained, by this modified method, a yield of 54.9% of "divinyl ether", boiling at 34-35° C. They did not mention the presence of any other products from their reaction, and they did not otherwise characterize the liquid obtained by them, nor did they publish any method for the purification of their product. However, they did state that on brominating the material previously described, boiling at 34-35° C., they obtained tetra-bromoethyl ether, which melted at 63-4° C. This bromoethyl ether was found by them to be identical with a product of the bromination of paracetaldehyde previously known as tetra-bromobutyraldehyde.

The synopsis of the previous work on the production of "divinyl ether" by these several authors, as set forth in their published reports, is shown in the following tabulation:

| Authors | Boiling point | Tetra-bromide melting point | Molecular weight | Analysis | Yield |
| --- | --- | --- | --- | --- | --- |
| Semmler | About 39° | | 70.1, 70.3 | None | |
| Knorr | | | | None | <1% (?) |
| Cretcher, Koch and Pittenger | 39° | | | None | 4.7% |
| Hibbert, Perry, and Taylor | 34-5° | 63-4° | | None | 54.9% |

In this state of the art, we further studied the reactions of β,β'-dichlor-diethyl ether and of the corresponding iodo-ether with heated alkalies. In our work we were enabled to confirm the results of Cretcher, Koch, and Pittenger, as to the various products obtained by them in conducting their reactions as described, and found that these included acetaldehyde, β-chloroethyl-vinyl ether, and 1,4-dioxane.

In addition to the other products obtained in these reactions, we also established the presence of ethylene oxide. Our preliminary work in this field further indicated that the reaction also developed some gaseous products such as acetylene, ethylene, and hydrogen.

It is clear, therefore, that the small amount of so-called "divinyl ether", obtained by these last named authors, reported to have a boiling point of 39° C., was a complex mixture, which they did not further investigate or define, and was not, in fact, true divinyl ether. It has been established that the true ether, and as produced by our process herein described, boils at 28.3°±0.3° C., at 760 mm.

We found that, in working with the process, the reaction with the alkali upon dichloro-diethyl ether is relatively slow at temperatures below 170° C., the optimum lying about 200-250° C. Pure sodium and potassium hydroxides have their melting points above 300° C., but ordinary grades, which contain water, fuse at a temperature below that at which the reaction with the chloro-ether takes place, and for practical considerations we prefer to use these latter forms which do not interfere otherwise with the orderly progress of the reaction.

When working in this way we found, however, that, in the course of the reaction, a crust of alkali chloride forms over the surface of the fused alkali. Under these conditions, very considerable relative quantities of aldehyde are formed. But when the alkali is well stirred, and the crust formation is thus prevented, we are enabled to reduce the quantity of aldehyde formed by the reaction to a practically unimportant minimum.

It was also found that the yield of the ether is very markedly increased by passing a slow stream of ammonia gas through the reaction and distilling systems throughout the entire process. The ammonia thus introduced into the system may either act as a true catalyst for the reaction or it may inhibit the decomposition of divinyl ether formed by the reaction; but in any event, it serves to increase very definitely the yield of the true divinyl ether.

In general the steps of the processes for the production of divinyl ether according to our invention may be restated as follows:

The β,β'-dihalogen-diethyl ether employed is reacted upon by fused alkali hydroxide in an autoclave under constant stirring to prevent the formation of any crust of alkali metal chloride which is prone to form over the surface of the reaction mixture. In the normal course of the reaction are developed divinyl ether, aldehyde, ethylene oxide, 1,4-dioxane, β-chloroethyl-vinyl ether, and gases as previously indicated. Without stirring, the formation of aldehyde is relatively large, which materially interferes with successful operation of the process, both as to the degree of purity, the character of the distillation product, and the yield. Furthermore, ammonia gas is, during the entire process passed through the reaction, distilling and condensing systems. This step provides for the substantial elimination of ethylene oxide and for the further elimination of the acetaldehyde, and thus gives an end distillate which is more suitable for the ultimate isolation of the ether in substantially pure form. It also serves, either directly or indirectly, catalytically or otherwise, to give a material increase in the yield of divinyl ether.

As an exemplification of a preferred practical application of the invention, the same will be set forth in the following example. It will be obvious from what has been disclosed that the process may be modified in its details without departing from the scope and spirit of the disclosures in this specification.

In the following specific example, the practice of the invention will be set forth in terms of the reaction of potassium hydroxide upon the chloroethyl ether, although other forms of halogen-ethyl ether and alkali hydroxide and mixtures may be alternatively applied as will be readily understood.

In this description reference is made to the accompanying drawing, which is to be understood as diagrammatic only, by means of corresponding letters and numerals, and is included and made part of this specification for the purpose of more readily elucidating the several steps of the process. The apparatus thus described may obviously be considerably modified in structural detail or as to elements employed or omitted without departing from the scope of the disclosures herein.

Example.—An apparatus is set up as in the reference diagram, which shows an autoclave D, an insulated column L, and a refluxing and condensing system A E G B C. A charge of 7 kilos of potassium hydroxide is placed in a two and a half gallon autoclave and heated to about 200° C. The autoclave D is provided with a stirrer S. The upper ends of the blades thereof are kept just above the surface of the potassium hydroxide. The stirrer is started. Cold water is circulated through condenser "A", condenser water in "B" kept at 25–35° C., and condenser water in "C" at about 0° C. The receiver "K" is cooled in a freezing mixture. A slow stream of ammonia gas (one to two bubbles per second) is led into the autoclave at "F" and the rate of flow adjusted so that a slight excess of ammonia escapes at H with the gaseous products of the reaction which are led outside. β,β'-dichloro-ethyl ether is added through trap I by way of funnel J until a steady refluxing of liquid takes place. The chloroether is continuously added thereafter at such a rate that refluxing is steady and the vapor at the top of condenser "B" is not at a higher temperature than 40° C. About 1.5–3 kg. of the chloroether may be added in a day. Thermometers T are placed at various points on the apparatus for convenience of control.

At intervals of several hours, when the condenser "B" becomes choked with liquid, the liquid is withdrawn through trap I. The liquid, consisting chiefly of a mixture of β,β'-dichloroethyl ether, β-chlorethyl vinyl ether and dioxane may be returned to the system after the excess dioxane is removed by washing with water.

The distillate collected at K is purified as follows: It is washed several times with water, dried with calcium chloride and distilled. The fraction boiling up to 40° C. is collected, washed several times with ice water, dried first over calcium chloride then over sodium and distilled through a column. After two fractionations practically the entire amount of liquid boils at 28.3°±0.3° C. at 760 mm.

The molecular weight found according to the Victor Meyer method was 74.43, 71.15; calculated for $C_4H_6O$ 70.05. Analysis for carbon and hydrogen gave the following results: C 67.78, 68.44; H 8.61, 8.61; calculated for $C_4H_6O$, C 68.52, H 8.64. Density determination gave the following results:

$$d_{20°}^{20°} 0.774; d_{4°}^{20°} 0.773$$

The molecular refraction for $C_4H_6O$, calculated by the Lorentz-Lorentz formula, =21.38, the value found was 21.93; the refractive index, using D-sodium light, $$N_D^{20°} 1.3989.$$

It is essential that efficient stirring of the fused potassium hydroxide is maintained during the entire reaction to prevent the formation of a crust over the surface of the fused alkali, as already indicated, and for this reason its level must be kept well below the upper arm of the stirrer blades. If this is disregarded there is reduced yield and the reaction is markedly slowed down.

The chloro-ethyl ether is fed slowly into the reaction chamber, and in such measure so as to avoid the choking of the trap condenser with refluxing liquid. From time to time it is nevertheless expedient to withdraw from the trap the excess of dioxane and of β-chloroethyl-vinyl ether, which also condenses in part in this portion of the system.

Our product, characterized as divinyl ether, has the following properties. It rapidly decolorized bromine in carbon-tetrachloride; is readily oxidized by an aqueous solution of potassium permanganate; shows no acetylenic linkage with ammoniacal cuprous chloride; reacts violently with concentrated sulphuric acid, yielding a black tarry resin and some free aldehyde; and gives a yellow color reaction with cold concentrated HCl and an odor of acetaldehyde. The carbon, hydrogen analysis, using a modification of Reid's method (Jour. Am. Chem. Soc., 34, 1033 [1912]) confirms the constitution, $C_4H_6O$.

Having thus set forth our invention, we claim:

1. As a new product, substantially chemically pure divinyl ether, being a volatile colorless liquid, boiling at about 28.3° C.±0.3° C. at 760 mm.

2. As a new product, divinyl ether, being a volatile colorless liquid, boiling at about $$28.3° C.±0.3° C.$$

at 760 mm., having density of $$d_{20°}^{20°} 0.774$$

and $$d_{4°}^{20°} 0.773$$

and a refractive index $$N_D^{20°} 1.3989.$$

3. As a new product, divinyl ether having a boiling point of about 28.3° C. and substantially free from acetaldehyde.

4. As a new product, divinyl ether having a boiling point of about 28.3° C. and substantially free from ethylene oxide.

5. As a new product, divinyl ether having a boiling point of about 28.3° C. and substantially free from acetaldehyde, ethylene oxide, dioxane, and halogen ethyl-vinyl ether.

6. In a process of making divinyl ether, involving the reaction of a fused alkali metal hydroxide upon β,β'-dihalogen-diethyl ether, the step of stirring the fused alkali in the reaction chamber to prevent the formation of any crust upon the surface of the fused alkali.

7. In a process of making divinyl ether, involving the reaction of a fused alkali metal hydroxide upon β,β'-dihalogen-diethyl ether and refluxing and distilling the reaction products, the step of maintaining in the reaction chamber, the circulating and distilling systems, an atmosphere of ammonia gas.

8. The process of making divinyl ether comprising the steps of reacting upon β,β'-dichloro-diethyl ether with fused potassium hydroxide, constantly stirring the mass of fused hydroxide during the continuance of the reaction to prevent the formation of any crust upon the surface of the fused alkali, refluxing in a continuous system, distilling through a condenser trap, and maintaining a flow of ammonia gas throughout the entire system.

9. The process of making divinyl ether comprising the steps of reacting upon β,β'-di-iodo ether with fused potassium hydroxide, constantly stirring the mass of fused hydroxide during the continuance of the reaction to prevent the formation of any crust upon the surface of the fused alkali, refluxing in a continuous system, distilling through a condenser trap, and maintaining a flow of ammonia gas throughout the entire system.

10. In a process for the production of unsaturated aliphatic ethers involving the action of β,β'-di-halogen substituted ethers on caustic alkali and distillation, the step of introducing and maintaining a stream of ammonia throughout the system.

11. Divinyl ether, having a boiling point of about 28.3° C., suitable for use in a general inhalation anesthetic.

12. In the process of producing divinyl ether by distillation of the reaction product of β,β'-dichlorethyl ether with caustic alkali, the steps which comprise repeatedly washing the distillate, drying with calcium chloride, and then re-distilling, to separate out the fraction boiling at about 28.3° C.

13. In the process of producing divinyl ether by distillation of the reaction product of β,β'-dichlorethyl ether with caustic alkali, the steps comprising repeatedly washing the distillate, drying over calcium chloride, redistilling, collecting the fraction boiling up to 40° C., repeatedly washing, drying first over calcium chloride then over sodium and re-distilling until the remaining product is substantially freed from lower boiling components and has a boiling point of substantially 28.3° C.

RANDOLPH T. MAJOR.
WILLIAM L. RUIGH.